United States Patent
Küng et al.

(10) Patent No.: US 11,047,719 B2
(45) Date of Patent: Jun. 29, 2021

(54) MAGNETO-INDUCTIVE FLOW METER AND OPERATING METHOD OF ANALYZING A VOLTAGE PULSE TO CORRECT AN ELECTRODE VOLTAGE PROFILE

(71) Applicant: Endress+Hauser Flowtec AG, Reinach (CH)

(72) Inventors: Thomas Küng, Münchenstein (CH); Günther Bähr, Therwil (CH)

(73) Assignee: Endress+Hauser Flowtec AG, Reinach (CH)

( * ) Notice: Subject to any disclaimer, the term of this patent is extended or adjusted under 35 U.S.C. 154(b) by 169 days.

(21) Appl. No.: 16/471,627

(22) PCT Filed: Nov. 22, 2017

(86) PCT No.: PCT/EP2017/080059
§ 371 (c)(1),
(2) Date: Jun. 20, 2019

(87) PCT Pub. No.: WO2018/114190
PCT Pub. Date: Jun. 28, 2018

(65) Prior Publication Data
US 2019/0383653 A1    Dec. 19, 2019

(30) Foreign Application Priority Data

Dec. 20, 2016   (DE) .................... 10 2016 124 977.7

(51) Int. Cl.
*G01F 1/60* (2006.01)
*G01F 1/58* (2006.01)

(52) U.S. Cl.
CPC ................ *G01F 1/60* (2013.01); *G01F 1/586* (2013.01)

(58) Field of Classification Search
None
See application file for complete search history.

(56) References Cited

U.S. PATENT DOCUMENTS

| | | | |
|---|---|---|---|
| 4,408,497 A | 10/1983 | Suzuki | |
| 4,597,295 A | 7/1986 | Goto et al. | |
| 5,905,206 A | 5/1999 | Herwig et al. | |
| 2004/0260484 A1 | 12/2004 | Wray | |
| 2014/0260662 A1 | 9/2014 | Rogers et al. | |

FOREIGN PATENT DOCUMENTS

| | | |
|---|---|---|
| CN | 1097868 A | 1/1995 |
| CN | 1409093 A | 4/2003 |
| CN | 101162163 A | 4/2008 |
| CN | 105793675 A | 7/2016 |
| DE | 10312058 A1 | 9/2004 |
| DE | 102013112373 A1 | 5/2015 |
| DE | 102014119453 A1 | 6/2016 |
| EP | 0969268 A1 | 1/2000 |
| EP | 1460394 A2 | 9/2004 |

*Primary Examiner* — Harshad R Patel
(74) *Attorney, Agent, or Firm* — Christopher R. Powers; Endress+Hauser (USA) Holding Inc.

(57) ABSTRACT

A magnetic-inductive flow meter and a method for operating such a magnetic-inductive flow meter for measuring the flow velocity or the volumetric flow rate of a medium in a measuring tube include subjecting the medium to magnetic fields of different polarity and field strength such that the changing between magnetic fields causes a voltage pulse in the medium and analyzing the voltage pulse to calculate a correction of an electrode voltage profile of a measuring electrode pair of the flow meter.

19 Claims, 3 Drawing Sheets

MAGNETO-INDUCTIVE FLOW METER AND OPERATING METHOD OF ANALYZING A VOLTAGE PULSE TO CORRECT AN ELECTRODE VOLTAGE PROFILE

CROSS-REFERENCE TO RELATED APPLICATIONS

The present application is related to and claims the priority benefit of German Patent Application No. 10 2016 124 977.7, filed on Dec. 20, 2016 and International Patent Application No. PCT/EP2017/080059 filed on Nov. 22, 2017, the entire contents of which are incorporated herein by reference.

TECHNICAL FIELD

The invention relates to a method for operating a magnetic-inductive flow meter for measuring the flow velocity or the volumetric flow of a medium in a measuring tube, and to such a flow meter.

BACKGROUND

Magnetic-inductive flow meters have been used for flow measurement for a long time. The principle of magnetic-inductive flow measurement is based upon the induction of flow-dependent electrical voltage in a conductive medium flowing through a measuring tube by means of a magnetic field, which magnetic field is perpendicular to the direction of flow. The magnetic field is usually generated by a coil system having one or more coils. The flow-dependent voltage is tapped by at least two measuring electrodes and evaluated by a measuring device. The flow of the medium through the pipeline can thus be determined from the measured voltage and the known magnetic field. Usually, magnetic fields with alternating polarity act upon the medium so as to minimize interference effects, which, regardless of a presence of a magnetic field, result in a measurable voltage between the measuring electrodes, and thus falsify a flow measurement. Patent specification DE10312058A1 describes such a flow meter. Another possibility for detecting interference effects is, between phases with a magnetic field, to establish resting phases without a magnetic field and to measure the interference effects. This is proposed in patent specification U.S. Pat. No. 4,597,295A. Disadvantageous in both realizations is the fact that, after changing to a magnetic field with inverted polarity or during a switch between a phase with magnetic field and a resting phase, a flow measurement or a measurement of the interference effects has to wait until the flow meter reaches a steady state. Thus, valuable time is lost, which is not available for a flow measurement. The aim of the invention is therefore to propose a method for operating a magnetic-inductive flow meter and such an electromagnetic flow meter by means of which the loss of time is minimized.

SUMMARY

The aim is achieved by a method and a magnetic-inductive flow meter according to present disclosure.

With a method according to the invention for operating a magnetic-inductive flow meter for measuring the flow velocity or the volumetric flow of a medium in a measuring tube, which magnetic-inductive flow meter comprises:
a measuring tube for guiding the medium;
a magnet system having at least one coil system for generating a magnetic field in the medium, wherein the magnetic field is substantially perpendicular to a measuring tube axis, wherein the magnetic field is caused by applying an electric coil voltage to the coil system;
at least one pair of measuring electrodes, arranged in the measuring tube, for detecting an electrode voltage, induced by the magnetic field, in the medium, which electrode voltage is substantially proportional to the flow velocity and the field strength of the magnetic field;
a measuring/operating circuit for operating the magnet system and for evaluating the electrode voltage;
during a feed phase, the magnetic field is generated and the electrode voltage is detected, wherein the feed phase has a measuring phase, in which measuring phase the magnetic field is substantially constant, wherein a measured value of the electrode voltage is used during the measuring phase to calculate the flow of the medium;
wherein, during a subsequent feed phase, a reverse polarity magnetic field is generated, wherein changing between feed phases causes an electrical voltage pulse to occur in the medium;
wherein the voltage pulse is analyzed to obtain information about a course of a deflection of the electrode voltage with respect to an end state,
wherein the end state is a state of a steady-state measurement system, which end state is used to calculate a flow.

The measuring system comprises the magnet system and the medium in the region of the magnetic field, as well as the measuring electrodes with leads to the measuring/operating circuit.

The magnet system may, in addition to the at least one coil system, also have a field feedback for conducting the magnetic field outside the measuring tube. Furthermore, the magnet system may have at least one pole shoe which is designed to conduct the magnet field between coil system and measuring tube. The at least one coil system may respectively have a coil core.

The electrode voltage is produced by a deflection of charge carriers caused by the flow of the medium through the measuring tube by means of the magnetic field, wherein the deflection direction is dependent upon the polarity of the charge carriers. This results in a separation of positively-charged from negatively-charged charge carriers, and thus an electrical voltage.

In one embodiment of the method, after obtaining the course of the deflection, the course of the electrode voltage is corrected as a function of the course of the deflection.

In one embodiment of the method, an averaged deflection is calculated by averaging the deflection of a respective voltage pulse of at least two feed phases, wherein the value of the electrode voltage or the measured value of the electrode voltage of a feed phase is corrected after calculating the averaged deflection.

In one embodiment of the method, a measurement of a first impedance of a circuit comprising the measuring electrodes and the medium and/or a second impedance of the medium is carried out.

In one embodiment of the method, a measured value of a first impedance of the circuit comprising the measuring electrodes as well as leads of the measuring electrodes with respect to the measuring/operating circuit and the medium, and/or a measured value of a second impedance of the medium, is determined, wherein the measured value of the first impedance and/or the measured value of the second impedance is used to analyze the voltage pulse.

In one embodiment of the method, the measured value of the first impedance is determined by means of the measuring electrodes, and/or wherein the measured value of the second impedance is determined by means of an impedance probe.

In one embodiment of the method, the electrode voltage is sampled during the feed phase at least twice, and, in particular, at least twenty times, and preferably at least fifty times.

In one embodiment of the method, the course of the voltage pulse is fitted by at least one fitting function, wherein the fitting function provides information about time point and amplitude of a maximum voltage pulse, and/or course of the amplitude drop of the voltage pulse, and/or time point of reaching an end state, and/or properties of the end state, and/or a pulse width of the voltage pulse, wherein the course of the deflection of the electrode voltage with respect to the end state is described on the basis of the fit parameters obtained by the fit or on the basis of fitting function parameters.

The fitting function may be selected from a purely mathematical viewpoint. However, it is also possible to draw upon physical or technical considerations in the selection of the fitting function and/or in case of a restriction of parameters of the fitting function.

In one embodiment of the method, the fit, at least in a first time interval, draws upon a function with a global extreme—for example, a Gaussian function.

In one embodiment of the method, the fit, at least in a second time interval, draws upon a monotonically-decreasing function—for example, a power function.

In one embodiment of the method, the fitting functions or fitting function parameters are selected from a look-up table.

In one embodiment of the method, at least one device-specific or instance-specific parameter is used during the fitting.

In one embodiment of the method, a measurement of a first impedance of a current loop comprising the measuring electrodes and the medium and/or of a second impedance of the medium is carried out during fitting.

In one embodiment of the method, the values of the magnetic fields of the measurement phases of adjacent feed phases differ from one another by less than 1% and, in particular, by less than 0.1%.

In one embodiment of the method, the feed phases underlying the calculation of the averaged deflection include the first feed phase precede or the first feed phase.

In one embodiment of the method, the feed phases underlying the calculation of the averaged deflection precede the first feed phase at least partially, wherein the feed phases underlying the calculation of the averaged deflection follow the first feed phase at least partially.

In one embodiment of the method, a difference in corrected measured values of the electrode voltage or a difference in corrected electrode voltages of the measuring phases of two successive feed phases is used to determine a flow measured value.

A magnetic-inductive flow meter according to the invention for measuring the flow velocity or the volumetric flow of a medium in a measuring tube comprises:

a measuring tube, which is configured to conduct the medium;

a magnet system having at least one coil system, which magnet system is configured to generate a magnetic field in the medium, wherein the magnetic field is substantially perpendicular to a measuring tube axis;

at least one pair of measuring electrodes arranged in the measuring tube, which electrodes are configured to detect a voltage, induced by the magnetic field, in the medium, which voltage is substantially proportional to the flow velocity and the field strength of the magnetic field;

a measuring/operating circuit, which is configured to realize the method according to the invention.

In one embodiment of the flow meter, the flow meter has an impedance probe for detecting the second impedance of the medium.

In one embodiment of the flow meter, the measuring/operating circuit has an interface for transmitting or receiving information relating to an externally-determined impedance of the medium.

In one embodiment, the magnet system comprises at least one field feedback, which is configured to at least partially guide the magnetic field outside the measuring tube between the measuring tube side opposite the coil system and the coil system.

BRIEF DESCRIPTION OF THE DRAWING

The invention will now be described with reference to exemplary embodiments.

DETAILED DESCRIPTION

Figure 1:
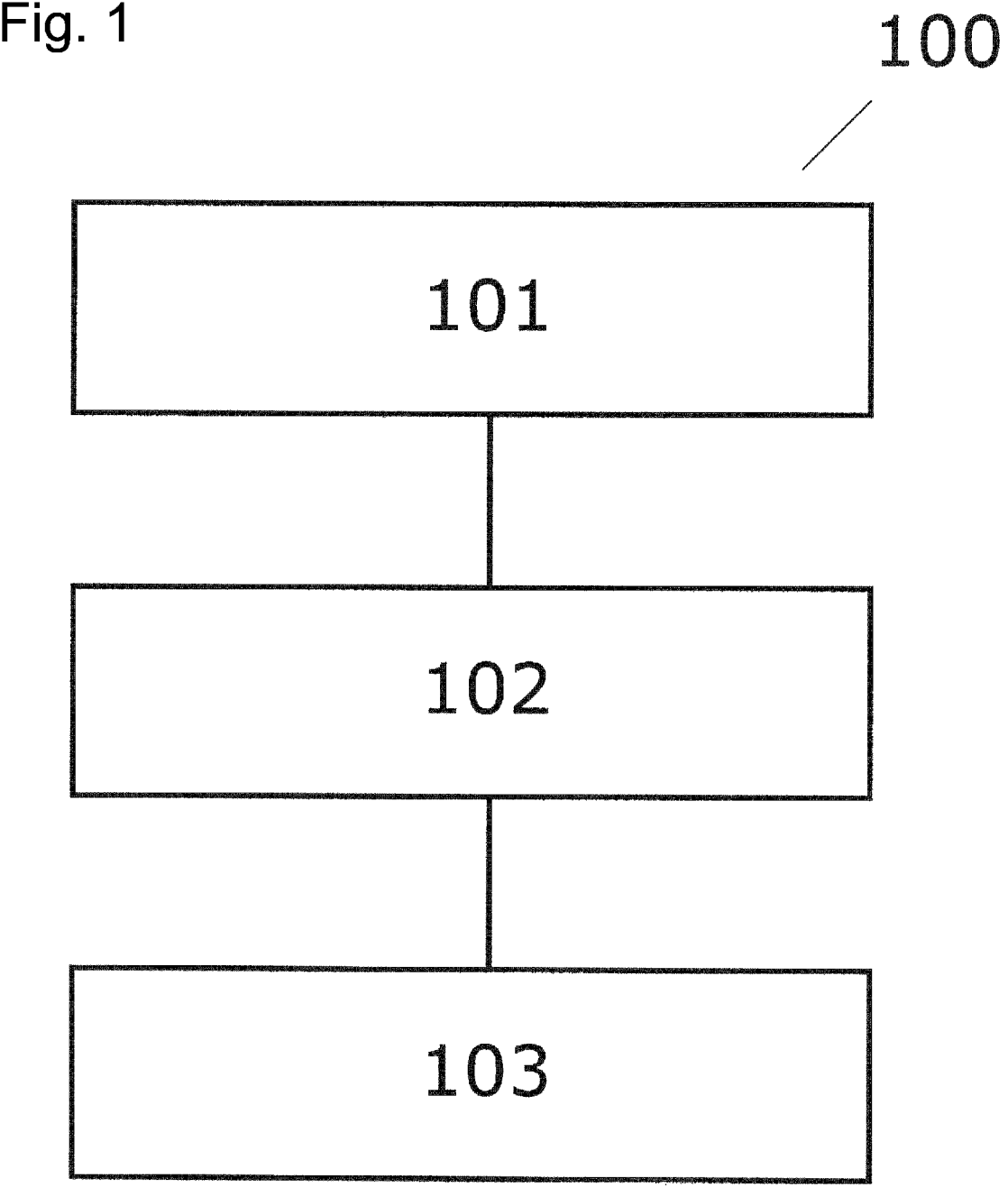
FIG. 1 shows a schematic process flow for operating a magnetic-inductive flow meter.

FIG. 1 sketches a sequence of a method 100 according to the invention for operating a magnetic-inductive flow meter. Such a flow meter comprises, as described in FIG. 3:

a measuring tube for guiding the medium;

a magnet system having at least one coil system for generating a magnetic field in the medium, wherein the magnetic field is substantially perpendicular to a measuring tube axis, wherein the magnetic field is caused by applying an electric coil voltage to the coil system;

at least one pair of measuring electrodes, arranged in the measuring tube, for detecting an electrode voltage, induced by the magnetic field, in the medium, wherein the electrode voltage is substantially proportional to the flow velocity and the field strength of the magnetic field;

a measuring/operating circuit for realizing the method according to the invention.

During the operation of the flow meter, during a feed phase, the magnetic field is generated and the electrode voltage detected. The feed phase has a measuring phase, in which measuring phase the magnetic field is substantially constant, wherein a measured value of the electrode voltage is used, during the measuring phase, to calculate the flow of the medium;

In a first method step 101 according to the invention, a magnetic field of reversed polarity is generated during a subsequent feed phase, wherein the switching between feed phases causes the generation of an electrical voltage pulse in the medium.

In a second method step 102 according to the invention, voltage pulse is analyzed in order to obtain information about a course of a deflection of the electrode voltage with respect to an end state. The end state is a state of a steady-state measuring system, wherein the measuring system comprises the magnet system and the medium in the region of the magnetic field, as well as the measuring electrodes with leads to the measuring/operating circuit.

In a third method step 103 according to the invention, the end state is used to calculate a flow.

Figure 2:
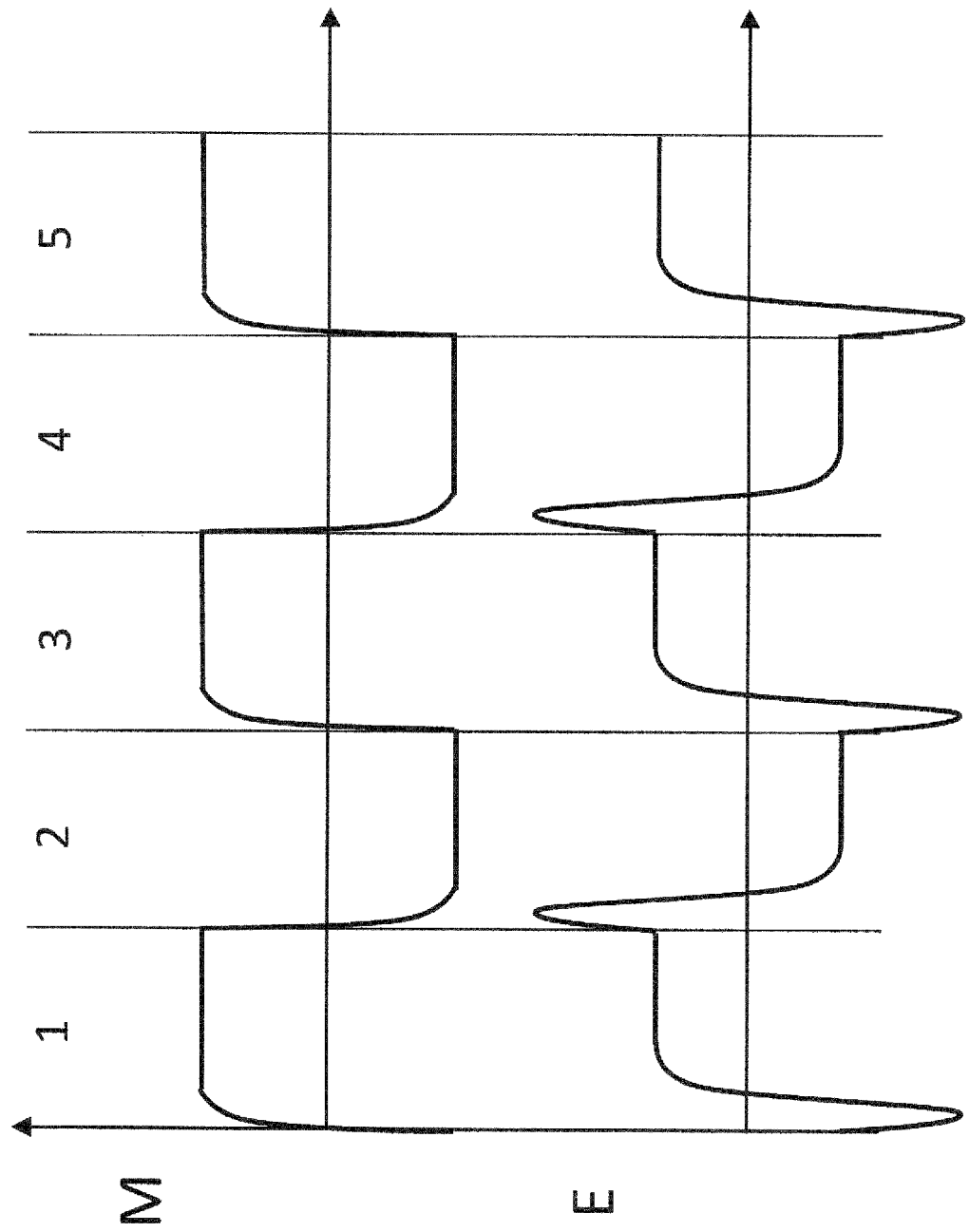
FIG. 2 shows an exemplary section of courses of magnetic fields and electrode voltages.

FIG. 2 sketches an exemplary and schematic segment of courses of magnetic fields and electrode voltages over a time t over several feed phases, wherein an upper curve M shows the course of magnetic fields during feed phases 1 through 5, and wherein a lower curve E shows the course of electrode voltages during feed phases 1 through 5. The course of the magnetic fields or electrode voltages during a single phase is characterized by a transient oscillation into an end state at the beginning of the phase and by a continuance in the end state after completion of the transient oscillation, wherein the settling time of the magnetic fields is shorter than the settling time of the electrode voltages. This is due to the fact that the electrode voltages react to the magnetic fields in a manner dependent upon the flow, wherein these reactions then also cause boundary layer effects at the medium-measuring electrode interfaces, which have a settling time dependent upon the conductivity of the medium, which is frequently longer than the settling time of the magnetic fields. The value of the electrode voltage during the end state is given by the current flow of the medium. During a feed phase, an at least sectionally constant magnetic field acts on the medium by means of the magnet system, wherein the magnetic field is generated by driving a coil system with a coil current.

For measuring a flow, an electrode voltage or a measured value of an electrode voltage is used at least during an end state of a feed phase. In particular, a difference in measured values of the electrode voltage is used to measure the flow, or a difference in electrode voltages of two successive feed phases is used to determine a flow measured value.

The electrode voltage after a switching operation of the magnet system depends not only upon the dynamics of the magnet system, but also upon the dynamic behavior of the boundary layers. The dynamics of the electrode voltage are influenced by the magnetic field and the change in the magnetic field during phase change, and by the effect of the boundary layer at the measuring electrode-medium interface. With switching, the electrode voltage exhibits a voltage pulse which decays to a substantially constant voltage state, wherein the decay results, inter alia, from a decay of the voltage across the boundary layer, wherein the voltage pulse represents an interruption in the electrode voltage as a result of the change in the magnetic field and the charge of a boundary layer capacitance. The polarity of a voltage pulse depends upon the polarity of the change in the magnetic field with feed phase change.

In methods for operating a magnetic-inductive flow meter according to the prior art, the detection of an electrode voltage or a measured value of an electrode voltage for calculating a flow waits until the transient oscillation of the electrode voltage has taken place, from which it follows that the transient phase is useless for a flow measurement.

An analysis of the voltage profile of the electrode voltage during a feed phase makes it possible to acquire a deflection of the electrode voltage relative to the end state of the measuring system, which end state is essentially determined by the flow of the medium and by the field strength of the magnetic field. Fitting the course of the electrode voltage with a suitable fitting function facilitates, for example, a direct calculation of the end state as a fitting parameter with associated uncertainties. It is also conceivable to deduct or to correct a function determined by a fit from a measured course of the electrode voltage. In this case, the course of the electrode voltage is substantially constant at least over part of the feed phase in the absence of further electrode-voltage-falsifying effects at a substantially constant flow. Thus, an end value may be determined, for example, by averaging individual measured values of the electrode voltage from the constant part. In the case of rapid changes in the flow during the feed phase, the electrode voltage may also increase or decrease in the steady state. Especially with very short feed phases, or high switching frequencies, the electrode voltage does not often reach an end state, so that, in the teachings of the prior art, a flow measurement would be incorrect. In this case, by the incorporation according to the invention of a fit, meaningful information about the end state may be obtained even without reaching an end state.

In the analysis, voltage pulses of several feed phases may also be averaged before a fit is carried out. The signal-to-noise ratio may thereby be improved, so that parameters with lower uncertainties may be obtained by a fitting. Alternatively, the fits of voltage pulses of several feed phases may also be averaged before a conclusion is drawn about an end state of a course of an electrode voltage of a feed phase. The fitting may also take into account physical-technical boundary conditions. For example, when selecting the fitting function, or parameters or parameter ranges of the fitting function, a measured value of a first impedance of a current loop comprising the measuring electrodes and the medium, and/or a measured value of a second impedance of the medium, may be used. Further boundary conditions may be given by at least one device-specific or instance-specific parameter. Due to the feed-phase change, voltage pulses of adjacent feed phases have different polarity. Either one considers, during averaging, only voltage pulses of the same polarity, or one corrects the polarity. The selection of the fitting function or the fitting function parameters may also take into account physical-technical boundary conditions.

For example, a function used for fitting the course of the electrode voltage may be looked up in a look-up table, in which look-up table at least one device-specific, and/or at least one instance-specific, and/or at least one application-specific parameter are stored, which parameters are linked to suitable fitting functions and/or fitting function parameters.

The courses of the individual magnetic fields are exemplary. In particular, at the beginning of a phase, an overvoltage may be applied to the coil system, so that the magnetic field achieves a desired state more quickly. In this case, an actual magnetic field course may deviate from the courses shown in FIG. 2.

Figure 3:
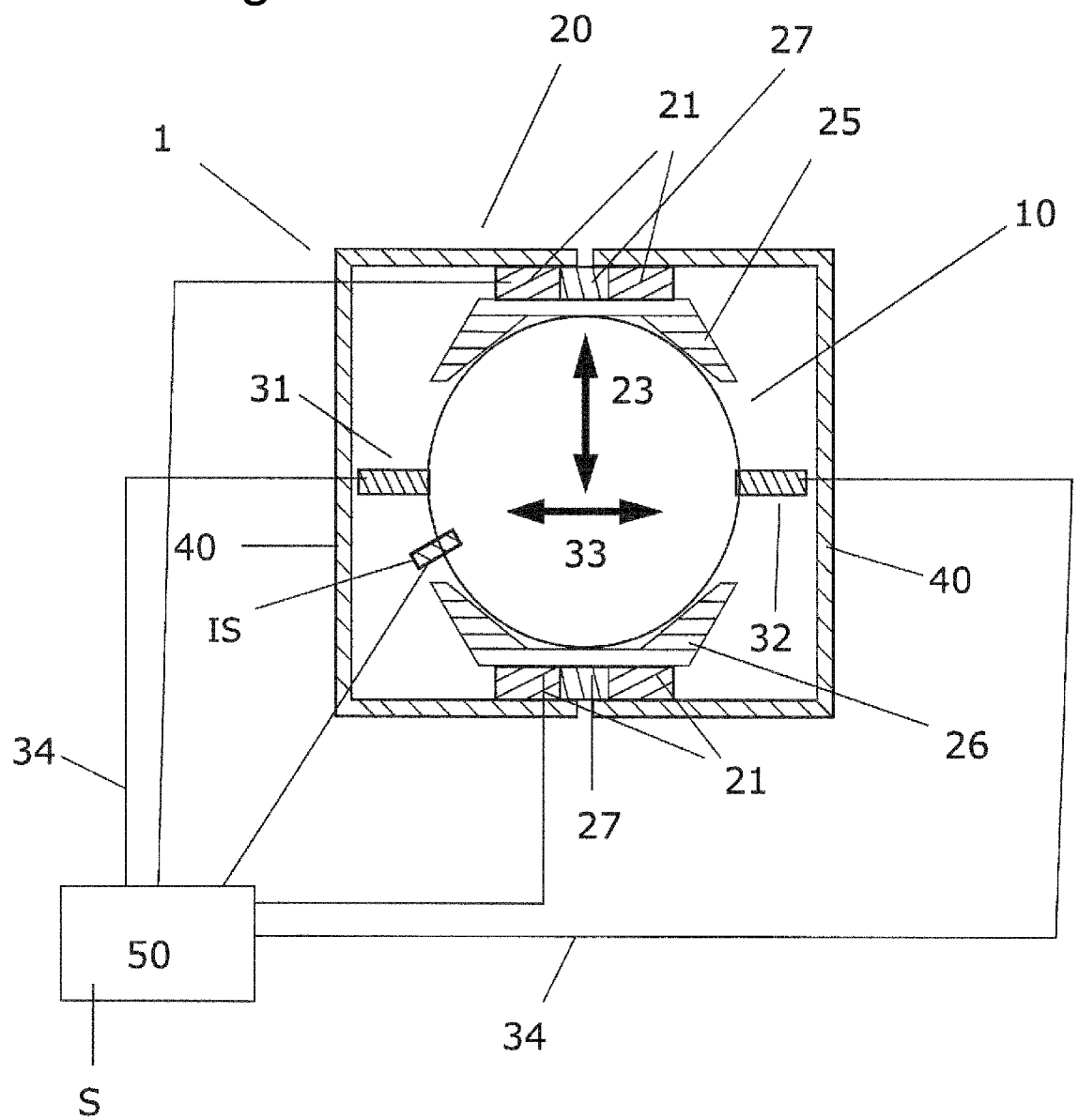
FIG. 3 shows an exemplary cross-section through a magnetic-inductive flow meter according to the invention.

FIG. 3 outlines a cross-section through a magnetic-inductive flow meter 1 according to the invention having a measuring tube 10; a magnet system 20 with coil systems 21 and 22, each having a coil core 27, pole shoes 25 and 26; and measuring electrodes 31 and 32 for detecting a voltage induced in the medium. The magnet system applies a magnetic field, which is aligned in the direction of arrow 23, to the medium in the measuring tube 10. The magnetic field and the flow of the medium through the measuring tube ensure that an electrode voltage is generated in the direction of arrow 33. The magnetic-inductive flow meter may, furthermore, comprise a field feedback 40 and/or an impedance probe 60. The measuring electrodes 31, 32, as well as the coil system 21, 22, as well as the impedance probe are connected to a measuring/operating circuit 50, which measuring/operating circuit 50 is configured to operate the coil system, the measuring electrodes, and, optionally, the impedance probe. The impedance probe is configured to detect the impedance of the medium. Alternatively or in addition to the impedance probe 60, the measuring/operating circuit 50 may have an interface S for transmitting or receiving information regarding an externally-determined impedance of the medium.

The invention claimed is:

1. A method for operating a magnetic-inductive flow meter for measuring the flow velocity or the volumetric flow of a medium in a measuring tube, the method comprising:
    providing a magnetic-inductive flow meter comprising:
        a measuring tube adapted for guiding the medium and having a measuring tube axis;
        a magnet system including a coil system configured to generate a magnetic field in the medium, wherein the magnetic field is generated by applying an electric coil voltage to the coil system, and wherein the magnetic field is perpendicular to the measuring tube axis;
        a pair of measuring electrodes disposed in the measuring tube and configured to detect an electrode voltage induced by the magnetic field in the medium, the electrode voltage being proportional to a flow velocity of the medium flowing in a measuring tube and to the field strength of the magnetic field; and
        a measuring/operating circuit configured to operate the magnet system and to operate upon the electrode voltage;
    defining a feed phase during which the magnetic field is generated and the electrode voltage is detected, the feed phase including a measuring phase during which the magnetic field is constant and a measured value of the electrode voltage is detected, wherein the measured value of the electrode voltage is used to calculate a flow of the medium;
    during a subsequent feed phase, reversing the polarity of the generated magnetic field, wherein changing between feed phases generates an electrical voltage pulse in the medium; and
    analyzing the voltage pulse to obtain information about a course of a deflection of the electrode voltage with respect to an end state, wherein the end state is a state of a steady-state measurement system, which end state is used to calculate the flow of the medium,
    wherein the course of the electrode voltage is corrected as a function of the course of the deflection.

2. The method of claim 1, wherein an averaged deflection is calculated by averaging the deflections from respective voltage pulses of at least two feed phases, wherein a value of the electrode voltage or a measured value of the electrode voltage of a feed phase is corrected based on the averaged deflection.

3. The method of claim 2, wherein the feed phases underlying the calculation of the averaged deflection precede a first feed phase or comprise the first feed phase.

4. The method of claim 2, wherein the feed phases underlying the calculation of the averaged deflection precede a first feed phase at least partially, and wherein the feed phases underlying the calculation of the averaged deflection follow the first feed phase at least partially.

5. The method of claim 1, wherein a measured value of a first impedance of a circuit including the measuring electrodes and the medium, and/or of a second impedance of the medium, is determined, and
    wherein the measured value of the first impedance and/or the measured value of the second impedance is used to analyze the voltage pulse.

6. The method of claim 1, wherein the measured value of the first impedance is determined using the measuring electrodes, and/or wherein the measured value of the second impedance is determined using an impedance probe.

7. The method of claim 1, wherein the electrode voltage is detected at least twice during the feed phase.

8. The method of claim 1, wherein the course of the voltage pulse is fitted to at least one fitting function, thereby generating a fit,
    wherein the fitting function provides information about a time point and amplitude of a voltage pulse maximum and/or a course of an amplitude drop of the voltage pulse and/or a time point of reaching the end state and/or properties of the end state and/or a pulse width of the voltage pulse, and
    wherein the course of the deflection of the electrode voltage with respect to the end state is described based on fit parameters obtained by the fit or based on substitute function parameters.

9. The method of claim 8, wherein the fit, at least in a first time interval, draws upon a function with a global extreme.

10. The method of claim 8, wherein the fit, at least in a second time interval, draws upon a monotonically-decreasing function.

11. The method of claim 8, wherein the fitting function or fit parameters are selected from a look-up table.

12. The method of claim 8, wherein at least one device-specific and/or instance-specific and/or application-specific parameter is used in the fitting or in the selection of the fitting function.

13. The method of claim 8, wherein a measured value of a first impedance of a circuit, including the measuring electrodes and leads of the measuring electrodes, is used for the measuring/operating circuit and the medium and/or for a second impedance of the medium during fitting or when selecting the fitting function.

14. The method of claim 13, wherein the measured value of the first impedance is determined using the measuring electrodes, and/or wherein the measured value of the second impedance is determined using an impedance probe.

15. The method of claim 1, wherein magnitudes of the magnetic fields of the measurement phases of adjacent feed phases differ from one another by less than 1%.

16. The method of claim 1, wherein a difference in measured values of the electrode voltage or a difference in electrode voltages of the measuring phases of two successive feed phases is used to determine a flow measured value.

17. A magnetic-inductive flow meter for measuring a flow velocity or a volumetric flow of a medium in a measuring tube, the flow meter comprising:
    a measuring tube configured to conduct the medium;
    a magnet system including at least one coil system and configured to generate a magnetic field in the medium, wherein the magnetic field is perpendicular to a measuring tube axis;
    at least one pair of measuring electrodes arranged in the measuring tube, which electrodes are configured to detect a voltage, induced by the magnetic field, in the medium, which voltage is proportional to the flow velocity and a field strength of the magnetic field;
    a measuring/operating circuit configured to perform the method of claim 1.

18. The flow meter of claim 17, wherein the flow meter includes an impedance probe configured to detect the second impedance of the medium, wherein the measuring/operating circuit is configured to operate the impedance probe.

19. The flow meter of claim 17, wherein the measuring/operating circuit includes an interface for transmitting or receiving information regarding an externally-determined impedance of the medium.

\* \* \* \* \*